United States Patent [19]

Kawamura

[11] Patent Number: 5,115,790
[45] Date of Patent: May 26, 1992

[54] RE-COMBUSTION CONTROL MEANS FOR ALCOHOL ENGINE

[75] Inventor: Hideo Kawamura, Kangawa, Japan

[73] Assignee: Isuzu Motors Limited, Tokyo, Japan

[21] Appl. No.: 593,447

[22] Filed: Oct. 4, 1990

[30] Foreign Application Priority Data

Oct. 31, 1989 [JP] Japan ................. 1-281919

[51] Int. Cl.⁵ .......................................... F02M 25/07
[52] U.S. Cl. ..................................... 123/571; 123/568
[58] Field of Search ............... 123/568, 569, 570, 571, 123/316, 3, 1 A, 40.11

[56] References Cited

U.S. PATENT DOCUMENTS

| | | |
|---|---|---|
| 3,789,807 | 2/1974 | Pinkerton . |
| 4,109,625 | 8/1978 | Kawamura et al. . |
| 4,192,265 | 3/1980 | Amano et al. ............... 123/316 X |
| 4,237,832 | 12/1980 | Hartig et al. ................ 123/316 X |
| 4,506,633 | 3/1985 | Britsch ........................ 123/568 X |
| 4,700,684 | 10/1987 | Pischinger et al. .............. 123/568 |
| 4,735,186 | 4/1988 | Parsons ......................... 123/568 |
| 4,875,455 | 10/1989 | Hashimoto et al. ............. 123/568 |
| 4,945,870 | 8/1990 | Richeson ..................... 123/568 X |

FOREIGN PATENT DOCUMENTS

| | | |
|---|---|---|
| 2827630 | 6/1979 | Fed. Rep. of Germany . |
| 3007927 | 4/1981 | Fed. Rep. of Germany . |
| 0067959 | 4/1983 | Japan . |
| 0117345 | 7/1983 | Japan . |
| 0105052 | 7/1984 | Japan . |

Primary Examiner—Willis R. Wolfe
Attorney, Agent, or Firm—Browdy and Neimark

[57] ABSTRACT

This re-combustion control means for an alcohol engine comprises intake and exhaust valves designed to be opened or closed by virtue of magnetic force that are disposed, respectively, in intake and exhaust ports of cylinders, control valves designed to be opened or closed by virtue of magnetic force that are disposed, respectively, in combustion gas ports communicating with each other via a combustion gas passageway, sensors for detecting a state in which the engine is operated, and a controller for controlling the supply of combustion gas from predetermined cylinders to the other cylinders via the combustion gas passageway in response to a detection signal detected by the sensors. In response to a signal informing that the engine is under partial load, the exhaust valves of the predetermined cylinders are maintained in a closed state with the control valves thereof being operated so as to be opened or closed, while the intake valves of the other cylinders are maintained in a closed state with the control valves thereof being operated so as to be opened or closed so that combustion gas produced in the predetermined cylinders is taken into the cylinders and is re-burned therein for complete combustion, the discharge of unburnt aldehyde or the like being thereby prevented.

8 Claims, 2 Drawing Sheets

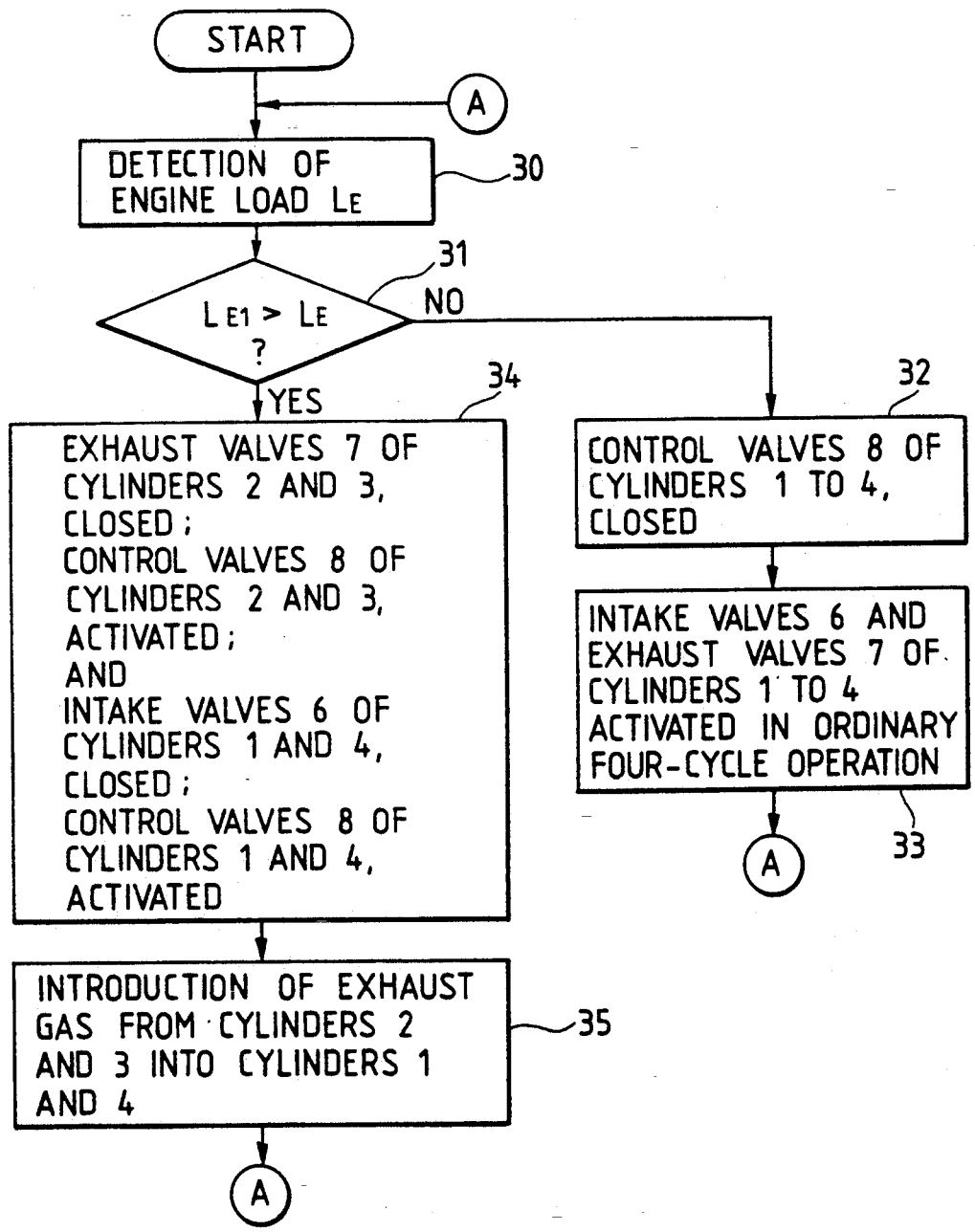

RE-COMBUSTION CONTROL MEANS FOR ALCOHOL ENGINE

BACKGROUND OF THE INVENTION

1. Field of the Invention

The present invention relates to a re-combustion means for an alcohol engine having valves adapted to be opened and/or closed by virtue of electromagnetic force.

2. Description of the Prior Art

More and more attention has been paid to alcohol engines since the environmental pollution due to exhaust gas discharged from engines became a social issue. Namely, as a fuel alcohol contains less carbon compared to gas oil and gasoline, and an alcohol engine using alcohol as a fuel is characterized in that the amount of carbon dioxide gas and carbides contained in exhaust gas discharged therefrom is remarkably small compared to the amount of those contained in exhaust gas discharged from engines using gasoline, gas oil or the like as a fuel.

However, the latent heat for vaporization of alcohol is higher than that of gasoline; gasoline requires a vaporization latent heat of 0.7% of fuel heat value, while alcohol requires a vaporization heat of 5% of fuel heat value. This means that alcohol fuel is difficult to vaporize, and moreover it is the characteristics of alcohol fuel that alcohol fuel injected from an injection nozzle into compressed air in a combustion chamber tends to lower the temperature of the compressed air and the wall surface of the combustion chamber due to vaporization, the ignition of fuel so injected being thereby adverse by effected.

It is well known that in a conventional exhaust gas re-circulating means for an engine unburnt fuel contained in exhaust gas discharged from cylinders of the engine is retaken into the cylinders for combustion, while a part of exhaust gas is caused to be mixed with suction air, the generation of NOx being thereby controlled.

However, in the alcohol engine using alcohol as a fuel, combustion under partial load is extremely different from that under high load, and due to this the alcohol engine has drawbacks in that combustion becomes unstable under partial load, while a speed at which air-fuel mixture is generated becomes low under high load. In particular, in a compression ignition type reciprocating engine, an ideal compression ratio for a normal direct injection type engine is generally accepted to range from 15 to 17. In this case, the compression end temperature is around 650° C., and when the engine has just been started, or air is cold, poor ignition and combustion occur, resulting in misfire or incomplete combustion. This tends to facilitate the generation of unburnt gas, producing odor or irritating odor inherent therein when it is discharged outside.

In particular, in a diesel engine employing alcohol fuel, since the temperature of the wall surface of the combustion chamber thereof is not high, when the engine is at low speed under low load, due to the high latent heat for vaporization of alcohol, the wall surface takes from fuel heat required for vaporization, and this prevents the promotion of vaporization of fuel, thereby making it difficult to produce vaporized air-fuel mixture.

In addition, when the engine is under partial load, the air-fuel ratio is great, in other words, fuel is lean, and if alcohol fuel is burned in this state, intermediate products such as formaldehyde, acetaldehyde and so forth are produced.

As a result, fuel is not completely burned at a low temperature, and the phenomenon in which unburnt gas is produced is very likely to occur, producing the odor or irritating odor inherent in unburnt gas. Moreover, the amount of hydrocarbon contained in exhaust gas becomes large, and poor ignition of fuel, i.e. poor starting-up of the engine is expected. Therefore, in the engine employing alcohol fuel, the amount of aldehyde to be discharged from the engine under partial load becomes large, and this causes a problem of producing the irritating odor, odor or the like. Thus, there are many problems to be solved with combustion conditions in a partial load area at a low temperature.

In addition, in regard to the engine employing alcohol fuel, the official gazette of Japanese Patent Laid-Open No. 67959/1983, for instance, discloses an alcohol reformed engine using reformed gas obtained by reforming alcohol with a view to purifying exhaust gas.

Furthermore, the official gazette of Japanese Utility Model Laid-Open No. 105052/1984, for instance, discloses a reformed gas engine using as a fuel reformed gas that is reformed from liquid fuel by means of a reforming means disposed at a certain position along the length of the engine exhaust passageway.

SUMMARY OF THE INVENTION

A primary object of the present invention is to solve the above problems by recognizing the fact that in an engine using alcohol as a fuel, although alcohol has a great latent heat for vaporization and is difficult to vaporize, unburnt intermediate products comprising aldehyde that are contained in exhaust gas discharged from the cylinders can be completely burned if they are sent back into the combustion chamber for re-combustion. Therefore, an object of the present invention is to provide a re-combustion control means for an alcohol engine comprising combustion gas ports formed in individual cylinders in addition to intake and exhaust ports formed therein, a combustion gas passageway establishing communications between the combustion gas ports, control valves disposed in the respective combustion gas ports in addition to intake and exhaust valves disposed in the intake and exhaust ports, respectively, and valve driving means for driving the control valves and the intake and exhaust valves by virtue of electromagnetic force, wherein the control valves and the intake and exhaust valves are driven to be opened or closed by means of the valve driving means independent of the crank angles, and wherein combustion gas that has burned in predetermined cylinders of a multiplicity of cylinders is sent again into the other cylinders via the combustion gas passageway for re-combustion when the engine is under partial load so that unburnt intermediate products contained in combustion gas so sent can be completely burned in the other cylinders, whereby the generation of aldehyde such as formaldehyde, acetaldehyde or the like is prevented, and the production of irritating odors, odors or the like is in turn prevented, thereby making it possible not only to purify exhaust gas to discharged it outside free from environmental health problem but also to improve the fuel economy of the engine through good combustion of fuel.

Another object of the present invention is to provide a re-combustion control mean for an alcohol engine that has a cylinder block having cylinders, a cylinder head secured to the cylinder block, pistons each reciprocating in the respective cylinders of the cylinder head, intake and exhaust ports disposed in the cylinder head, intake and exhaust valves disposed in the intake and exhaust ports, respectively, and a means for supplying alcohol fuel to the engine, and that is designed to sequentially operate in four-cycle of intake, compression, expansion and exhaust strokes, the re-combustion control means comprising intake and exhaust valves disposed, respectively in the intake and exhaust ports of cylinders and adapted to be opened and/or closed by virtue of electromagnetic force, control valves disposed, respectively, in combustion gas ports communicating with each other via a combustion gas passageway, a sensor for detecting an operating state of the engine, and a controller for performing controls such that combustion gas produced in predetermined cylinders is supplied into other cylinders via the combustion gas passageway in response to a detection signal from the sensor.

A further object of the present invention is to provide a re-combustion control means for an alcohol engine in which in response to a signal from a load sensor informing that the engine is under partial load the exhaust valves of predetermined cylinders are maintained in a closed state with the control valves thereof being operated so as to be opened or closed, while the intake valves of the other cylinders are maintained in a closed state with the control valves thereof being operated so as to be opened or closed so that combustion gas produced in the predetermined cylinders is supplied into the other cylinders for re-combustion, expansion work being thereby performed, in which case since combustion gas fed out into the combustion gas passageway has already been burned in the combustion chambers and hence is high in temperature, and since it has already become rich air-fuel mixture after a substantial amount of oxygen was consumed, when the rich air-fuel mixture is supplied into the combustion chambers of the other cylinders for re-combustion, unburnt aldehyde, hydrocarbon, carbon monoxide and so forth can be easily completely burned, whereby the inclusion of unburnt fuel and intermediate products in exhaust gas finally discharged from the engine is prevented, thereby making it possible to eliminate the generation of irritating odors, odors or the like in exhaust gas discharged outside.

A still further object of the present invention is to provide a re-combustion control means for an alcohol engine in which in response to a signal from the load sensor informing that the engine is under high load the control valves are maintained in a closed state with the intake and exhaust valves thereof being normally operated so as to be opened or closed, in which case since combustion is actively performed when the engine is under high load, the temperature inside the combustion chambers is high, and the vaporization of alcohol fuel is promoted to thereby rapidly produce air-fuel mixture, which is then ignited to burn, the generation of unburnt aldehyde, hydrocarbon, carbon monoxide and so forth being thereby eliminated.

A further object of the present invention is to provide a re-combustion control means for an alcohol engine in which in response to a signal from the load sensor informing that the engine is under partial load the exhaust valves of two cylinders out of four cylinders are maintained in a closed slate with the control valves thereof being operated so as to be opened or closed, while the intake valves of the remaining two cylinders are maintained in a closed state with the control valves thereof being operated so as to be opened or closed so that combustion gas produced in the predetermined cylinders is supplied into the remaining two cylinders for re-combustion therein, the expansion work being thereby performed, whereby not only the output of the engine is improved even when the engine is under partial load but also alcohol fuel is completely burned, thereby making it possible not only to execute good combustion by completely burning air-fuel mixture of alcohol fuel and suction air by re-burning combustion gas that has already been burned so that the generation of intermediate products such as aldehyde or the like, unburned gas, odors, irritating odors, hydrocarbon and so forth is prevented but also to improve the fuel economy of the engine.

BRIEF DESCRIPTION OF THE DRAWINGS

FIG. 3 is a process flow chart showing an example of the operation of the re-combustion control means for an alcohol engine shown in FIG. 1.

DETAILED DESCRIPTION OF THE INVENTION

Referring to the accompanying drawings, one embodiment of a re-combustion control means for an alcohol engine according to the present invention will be described below.

Figure 1:
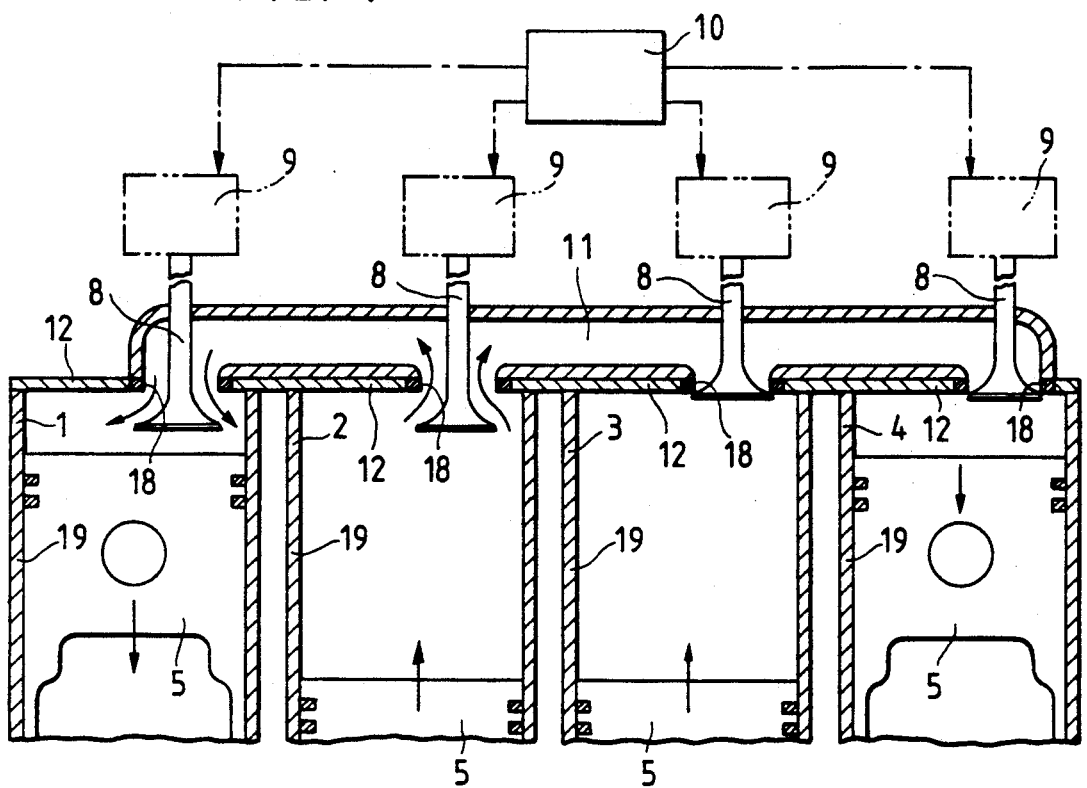
FIG. 1 is a cross-sectional view of an embodiment of a re-combustion control means for an alcohol engine according to the present invention.
Figure 2:
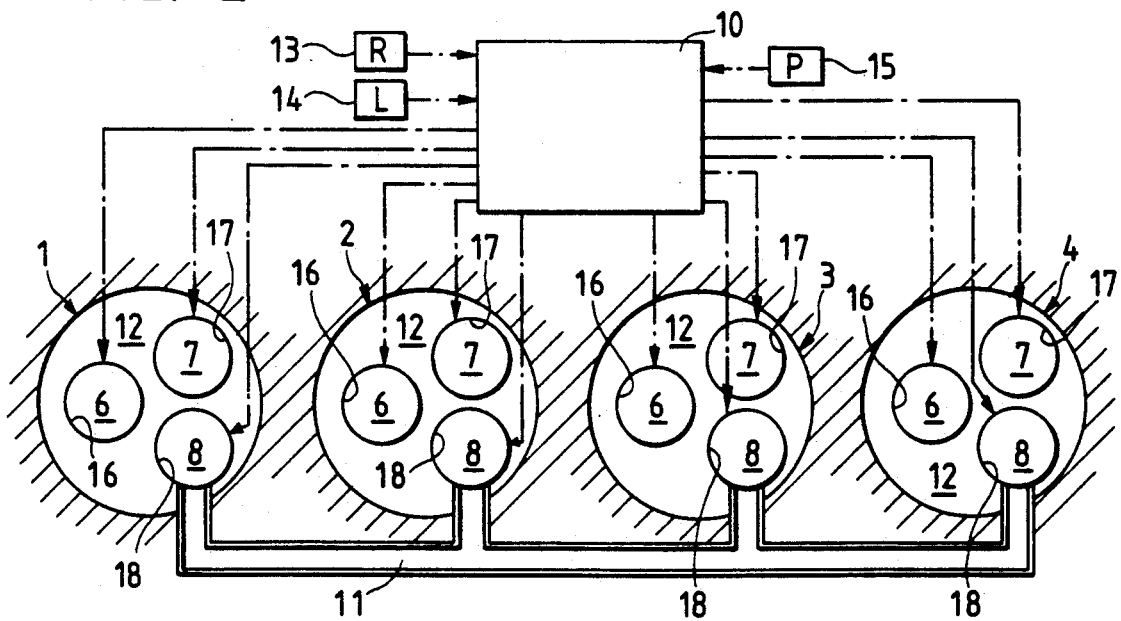
FIG. 2 is an explanatory view explaining the control of the opening and/or closing operation of intake and exhaust valves and control valves of the re-combustion control means for an alcohol engine shown in FIG. 1.

FIG. 1 is a schematic explanatory view showing one embodiment of the re-combustion control means for an alcohol engine according to the present invention, and FIG. 2 is a schematic plan view explaining the re-combustion control means for an alcohol engine shown in FIG. 1. In this embodiment, a four-cylinder alcohol engine is taken as an example for the sake of clear understanding of an explanation of the re-combustion control means for an alcohol engine to be made as below.

This alcohol engine comprises cylinders 19, constituted by four cylinders 1, 2, 3, 4, that are formed in a cylinder block, a cylinder head 12 secured to the cylinder block, and pistons 5 each designed to reciprocate in the respective cylinders 19. Intake ports 16 and exhaust ports 17 for the respective cylinders 1, 2, 3, 4 are formed in the cylinder head 12, and on top of these intake and exhaust ports 16, 17, combustion gas ports 18 as a third port for the respective cylinders 1, 2, 3, 4 are also formed in the cylinder head 12. Intake valves 6 are disposed, respectively, in the intake ports 16 formed in the cylinder lead 12, and exhaust valves 7 are disposed, respectively, in the exhaust ports 17 formed in the cylinder head 12. Control valves 8 are also disposed, respectively, in the combustion gas ports 18. These combustion gas ports 18 are constructed such that they communicate with each other via a combustion gas passageway 11.

In addition, although not shown in the drawings, the intake ports 16 are connected to intake pipes so that suction air is introduced therethrough into the cylinders 19, i.e. cylinders 1, 2, 3, 4, and the exhaust ports 17 are connected to exhaust pipes so that exhaust gas produced in the cylinders 19 is discharged therefrom. Moreover, this alcohol engine has a fuel supply means for supplying alcohol fuel into the engine, i.e. the cylinders 19. This fuel supply means comprises a fuel injection pump and fuel injection nozzles for injecting alcohol fuel fed out of the fuel injection pump into the cylinders 19 or into the intake pipes.

This alcohol engine constructed as described above is designed to sequentially operate in four-cycle; intake, compression, expansion and exhaust strokes. In this alcohol engine, for instance, when the engine is under partial load, a high output of the engine is not needed, in which case suction air is taken into two cylinders out of the four for normal combustion, while the remaining two cylinders are operated so as only to take thereinto combustion gas resulting from the combustion of fuel in the two cylinders and perform expansion work by re-burning the combustion gas so taken into for complete combustion, clean exhaust gas resulting from the complete combustion being thereafter discharged outside. Namely, the intake valves 6 of the cylinders 1 and 4 are maintained in a closed state so that no suction air is taken thereinto from the outside with the control valves 8 thereof being operated so as to be opened or closed so that combustion gas produced in the cylinders 2 and 3 is taken into the cylinders 1 and 4 for the complete burning of the same. In contrast, the exhaust valves 7 of the cylinders 2 and 3 are maintained in a closed state so that combustion gas produced therein is not allowed to be discharged outside but is fed into the cylinders 1 and 4 by operating the control valves 8 so as to be opened or closed. To be concrete, as shown in FIG. 1, with the control valve 8 being opened, the cylinder 1 is in an initial stage of its intake stroke, while with the control valve 8 being opened, the cylinder 2 is in an initial stage of its exhaust stroke. At this time, with the control valve 8 being closed, the cylinder 3 is in an initial stage of its compression stroke, while with the control valve 8 being closed, the cylinder 4 is in an initial stage of its expansion stroke.

These intake, exhaust and control valves 6, 7, 8 are constructed so as to be opened or closed by virtue of electromagnetic force generated by valve driving means 9. These valve driving means 9 are designed to open or close the valves in response to commands sent from a controller 10. Receiving detection signals from revolution, load and position sensors 13, 14, 15, this controller 10 is designed not only to drive the valve driving means 9 for opening or closing the intake, exhaust and control valves 6, 7, 8 but also to control, for instance, the injection timing and injection volume of the fuel injection pump as a fuel supply means, as well as the operation of a glow lamp. Thus, the controller 10 controls the relevant means such that their operating conditions are optimized to a state in which the engine is currently being operated.

Taking the control valve 8 as an example, one embodiment of the valve driving means 9 that can be installed in the re-combustion control means for an alcohol engine will next be briefly described.

The control valve 8 is constructed such that it is opened or closed by energizing the valve driving means 9, and that it is maintained in a closed state when the valve driving means 9 is not energized. The valve face of the control valve 8 is brought into abutment with a valve seat provided on the combustion gas port 18 when the control valve 8 is caused to ascend, while the valve face is separated from the valve seat when the control valve 8 is caused to descend, the opening or closing of the combustion gas port 18 being thereby executed. Therefore, the volume of combustion gas to be taken into or discharged from the cylinders 19 is thus controlled by the opening or closing operation of the combustion gas port 18 or the area of the combustion gas port to be opened or closed.

A movable element formed from a magnetic material such as soft-iron or the like is secured to the top end portion of a valve stem of the control valve 8, and a movable-element coil is provided on this movable element. In addition, a stationary element formed from a magnetic material such as soft-iron or the like is placed above the movable element in such a manner as to correspond thereto, and a stationary-element coil is provided on this stationary element. In this construction, when operating the control valve 8 so as to open or close the same in response to a command from the controller 10, the energization of the movable-element and stationary-element coils may be executed or stopped in accordance with a command from the controller 10, whereby the stationary element draws the movable element thereto or causes the same to separate therefrom, the control valve 8 being thereby vertically moved.

Although not shown in the drawings, a valve spring is interposed between a valve spring seat formed on the top surface of the cylinder head 12 and the movable element. Therefore, the control valve 8 is normally biased by the action of the spring force of the valve spring in such a direction as to close the combustion gas port 18, i.e., it is maintained in a closed state.

By constructing the control valve 8 as described above, the stationary element is allowed to separate from or draw to the movable element against the biasing force of the valve spring when the energization of the movable and stationary elements with current controlled by the controller 10 is executed or stopped, whereby the control valve 8 is caused to descend or ascend with the valve surface of the control valve 8 being caused to open or close the combustion gas port 18. It is needless to say that the construction of the valve driving means 9 is not limited to one described above.

Although a valve driving means for opening or closing the intake and exhaust valves 6,7 is not shown in the drawings, a valve driving means 9 similar to one described above may be employed to open or close the intake and exhaust valves 6, 7. Therefore, the intake, exhaust and control valves 6, 7, 8 are constructed such that they are opened or closed independent of the crank angles.

The valve driving means 9 for controlling, respectively, the intake, exhaust and control valves 6, 7, 8 that can be installed in the re-combustion control means for an alcohol engine are designed to be controlled by signals sent from the controller 10 in accordance with detection signals supplied thereinto, respectively, from the revolution sensor 13 for detecting the number of revolutions of the cranks as the number of revolutions of the engine, the load sensor 14 for detecting the volume of fuel to be supplied from the fuel supply pump to the engine or the distance by which the accelerator pedal is stepped down as a load being put on the engine, and the position sensor 15 for detecting the crank angles as the position of stroke.

Referring to FIGS. 1, 2 and 3, one example of the operation of the re-combustion engine control means for an alcohol engine according to the present invention will next be described. FIG. 3 is a process flow chart showing one example of the operation of the re-combustion control means for an alcohol engine according to the present invention.

When the engine is started, the fuel supply pump and the respective valve driving means 9 for the intake and exhaust valves 6, 7 are driven and controlled.

First, when the engine is started as a first step, the control valves 8 are operated by a command from the controller 10 so as to close the combustion gas ports 18. In this alcohol engine, the respective cylinders 1, 2, 3, 4 are designed to operate in four-cycle of intake, compression, expansion and exhaust strokes in accordance with commands sent by the controller 10. Alcohol fuel is supplied from the fuel injection pump constituting the fuel supply means to the fuel injection nozzles, and alcohol fuel so supplied is then injected from the fuel injection nozzles into the combustion chambers of the respective cylinders 1, 2, 3, 4 or into a suction air passageway communicating with the respective cylinders 1, 2, 3, 4. A detection signal sent from the load sensor 14 will be taken to explain detection signals supplied into the controller 10 so as to inform the same of a state in which the engine is being operated in this embodiment. It is needless to say that a signal sent from the revolution sensor 13 informing of the number of revolutions of the engine may be used as a detection signal.

In order to detect the engine load LE by means of the load sensor 14, the volume of alcohol fuel to be supplied from the fuel injection pump to the fuel injection nozzles may be detected. A detection signal informing of the volume of alcohol fuel supplied to the fuel injection nozzles is supplied into the controller 10 as a signal informing of the engine load (Step 30). In synchronism with this, the crank angles of the respective cylinders 1, 2, 3, 4 are detected by means of the position sensor 15. These detection signals are then supplied to the controller 10, where which strokes the respective cylinders are currently performing is judged.

In the controller 10, the engine load $L_E$ detected by the load sensor 14 is compared to a predetermined engine load $L_E$ so as to judge which is greater of the two loads (Step 31).

In a case where the engine load $L_E$ is judged by the controller 10 as being greater than the predetermined engine load $L_{E1}$, the engine is under high load, and it is in a state in which combustion is being actively performed. Therefore, the temperature inside the combustion chambers is high, and the vaporization of alcohol fuel is being promoted, resulting in complete combustion of alcohol fuel. This means that unburnt aldehyde is not contained in exhaust gas, and hence there will be no problem of environmental pollution due to exhaust gas even if it is discharged outside. In this state, the controller 10 receives a signal informing that the engine is under high load, and sends a command to the valve driving means 9 that the control valves 8 be maintained in a closed state (Step 32), while the intake and exhaust valves 6, 7 are controlled by the associated valve driving means 9 so as to perform opening and closing operations in normal four-cycle sequence (Step 33). Therefore, the combustion chambers of the respective cylinders 1, 2, 3, 4 are put in a state in which combustion is actively being performed, and in this state, the vaporization of alcohol fuel is promoted, and good air-fuel mixture is produced. Therefore, the vaporization of atomized alcohol fuel is also promoted and combustion is effected in a smooth fashion, this preventing the generation of unburnt gas such as aldehyde or the like.

Following this, whether or not the engine continues to be driven is judged, and whether or not there are abnormal signals sent from the various types of sensors provided for the engine is judged in process steps. In a case where there is no abnormal signal found and where the engine continues to be run, the process flow goes back to Step 30, while in a case the engine is stopped or where there is/are an abnormal signal/signals found, the processing by this control means should be brought to an end.

In Step 31, in a case where the engine load $L_E$ is judged by the controller 10 as being smaller than the predetermined engine load $L_{E1}$, the engine is under low load, and combustion being performed is not strong. In this state, the temperature inside the combustion chambers is low, and therefore the vaporization of alcohol fuel is not sufficient, and alcohol fuel is not able to be completely burned. Unburnt fuel of aldehyde is caused to remain in combustion gas produced in this state, and once such combustion gas is discharged outside as exhaust gas, this causes environmental pollution of odors or irritating odors. However, when the engine is under low load, a high output of the engine is not needed. In order to meet this requirement, in the alcohol engine of the present invention, the cylinders 2, 3 out of the four cylinders are driven such that suction air is taken thereinto from the outside, while the cylinders 1, 4 are controlled such that combustion gas produced in the cylinders 2, 3 is introduced thereinto so that combustion gas so taken into is re-burned therein for complete combustion. First, the controller 10 receives a signal informing that the engine is under low load, and sends a command to the valve driving means 9 that the control valves 8 of the respective cylinders 1, 2, 3, 4 be operated so as to be opened or closed, while it drives the valve driving means 9 such that the exhaust valves 7 of the cylinders 2, 3 are maintained in a closed state with the intake valves 6 of the cylinders 1, 4 being maintained in a closed state (Step 34).

In this state, in response to a command from the controller 10 the intake and control valves 6, 8 of the cylinders 2, 3 are operated so as to be opened or closed, while the control and exhaust valves 8, 7 of the cylinders 1, 4 are operated so as to be opened or closed. Therefore, the cylinders 2, 3 take thereinto suction air from the outside or air-fuel mixture of alcohol fuel via the intake pipe and the intake ports 16, and air-fuel mixture of alcohol fuel and suction air is burned with combustion gas so produced being discharged outside from the combustion gas port via the combustion gas passageway 11, while the cylinders 1, 4 take thereinto combustion gas from the combustion gas ports 18 via the combustion gas passageway 11 so that combustion gas so taken into is re-burned therein for complete combustion with exhaust gas resulting from the complete combustion being discharged outside from the exhaust ports 17 via the exhaust pipe (Step 35). In this construction, therefore, since combustion gas resulting from combustion of alcohol fuel in the combustion chambers of the cylinders 2, 3 is re-burned for complete combustion, exhaust gas discharged from the cylinders 1, 4 is clean and contains no unburnt aldehyde or the like, and hence the generation of odors or irritating odors is thus eliminated.

Following this, whether or not the engine continues to be driven is judged, and whether or not there are abnormal signals sent from the various types of sensors provided for the engine is judged in process steps. In a case where there is no abnormal signal found and where the engine continues to be run, the process flow goes back to Step 30, while in a case the engine is stopped or where there is/are an abnormal signal/signals found, the processing by this control means should be brought to an end.

What is claimed is:

1. Re-combustion control means for an alcohol engine having a cylinder block provided with cylinders, a cylinder head secured to said cylinder block, pistons each reciprocating in said cylinders of said cylinder block, intake ports and exhaust ports formed in said cylinder head, and intake valves and exhaust valves disposed in said intake ports and exhaust ports, respectively, and designed to sequentially operate in four-cycle of intake, compression, expansion and exhaust strokes.

said re-combustion control means comprising:
control valves disposed in said combustion gas ports,
a combustion gas passageway establishing communication between said combustion gas ports,
valve driving means for operating said intake, exhaust and control valves so as to be opened or closed by virtue of electromagnetic force, and
said engine has four cylinders, wherein any two selected cylinders of said four cylinders take thereinto suction air via said intake ports and discharge combustion gas into said combustion gas passageway via said combustion gas ports, wherein the other two cylinders take thereinto combustion gas in said combustion gas passageway via said combustion gas ports, and wherein re-combustion gas is discharged outside via said exhaust ports;
whereby said re-combustion control means is controlled such that alcohol fuel is burned with air introduced via said intake ports of the selected cylinders of said cylinders, that combustion gas from said selected cylinders is discharged into said combustion gas passageway by opening said control valves during an exhaust stroke, that combustion gas is then supplied into the other cylinders from said combustion gas passageway by opening said control valves of the other cylinders that are performing an intake stroke, so that said combustion gas so supplied is re-burned in said other cylinders, and that combustion gas resulting from the re-combustion is then discharged outside by opening said exhaust valves of said other cylinders during an exhaust stroke.

2. Re-combustion control means for an alcohol engine having a cylinder block provided with cylinders, a cylinder head secured to said cylinder block, pistons each reciprocating in said cylinders of said cylinder block, intake ports and exhaust ports formed in said cylinder head, intake valves and exhaust valves disposed in said intake ports and exhaust ports, respectively, and means for supplying alcohol fuel into said cylinders, and designed to sequentially operate in four-cycle of intake, compression, expansion and exhaust strokes, said re-combustion control means comprising;
combustion gas ports formed in said cylinder head,
control valves disposed in said combustion gas ports,
a combustion gas passageway establishing communication between said combustion gas ports,
valve driving means for operating said intake, exhaust and control valves so as to be opened or closed by virtue of electromagnetic force,
a load sensor for detecting the loaded state of the engine, and
a controller for performing controls such that in response to a detection signal from said load sensor informing that the engine is under partial load said exhaust valves of said predetermined cylinders out of said cylinders are maintained in a closed state with said control valves being operated so as to be opened or closed so that combustion gas is discharged into said combustion gas passageway via said combustion gas ports, while said intake valves of said other cylinders are maintained in a closed state with said control valves of being operated so as to be opened or closed so that combustion gas in said combustion gas passageway is supplied into said other cylinders via said combustion gas ports, that combustion gas produced after re-burned is discharged outside via said exhaust ports of said other cylinders, and that in response to a detection signal from said load sensor informing that the engine is under high load said control valves are maintained in a closed state with said exhaust and intake valves being normally operated so that suction air is introduced into each of said cylinders via said intake ports with combustion gas being discharged outside via said exhaust ports.

3. Re-combustion control means for an alcohol engine as set forth in claim 2, wherein in response to a signal from said load sensor informing that the engine is under partial load said exhaust valves of said predetermined cylinders are maintained in a closed state with said control valves being operated so as to be opened or closed, while said intake valves of said other cylinders are maintained in a closed state with said control valves being operated so as to be opened or closed so that combustion gas from said predetermined cylinders is supplied into said other cylinders for complete combustion therein, the discharge of unburnt gas to the outside being thereby prevented.

4. Re-combustion control means for an alcohol engine as set forth in claim 2, wherein said load sensor is designed to detect the engine load by detecting the fuel supply amount of alcohol fuel that is supplied to the engine.

5. Re-combustion control means for an alcohol engine having a cylinder block provided with cylinders, a cylinder head secured to said cylinder block, pistons each reciprocating in said cylinders of said cylinder block, intake ports and exhaust ports formed in said cylinder head, intake valves and exhaust valves disposed in said intake ports and exhaust ports, respectively, and means for supplying alcohol fuel into said cylinders, and designed to sequentially operate in four-cycle of intake, compression, expansion and exhaust strokes, said re-combustion control means comprising;
combustion gas ports formed in said cylinder head,
control valves disposed in said combustion gas ports,
a combustion gas passageway establishing communication between said combustion gas ports,
valve driving means for operating said intake, exhaust and control valves so as to be opened or closed by virtue of electromagnetic force,
a load sensor for detecting the loaded state of the engine, and a controller for performing controls such that in response to a detection signal from said load sensor informing that the engine is under partial load said exhaust valves of said predetermined cylinders out of said cylinders are maintained in a closed state with said control valves being operated so as to be opened or closed so that combustion gas is discharged into said combustion gas passageway via said combustion gas ports, while said intake valves of said other cylinders are maintained in a closed state with said control valves being operated so as to be opened or closed so that combustion gas in said combustion gas passageway is supplied into said other cylinders via said combustion gas ports, and that combustion gas produced after re-burned is discharged outside via said exhaust ports of said other cylinders.

6. Re-combustion control means for an alcohol engine as set forth in claim 5, wherein in response to a signal from said load sensor informing that the engine is under partial load said exhaust valves of said predetermined cylinders out of said cylinders are maintained in a closed state with said control valves being operated so as to be opened or closed, while said intake valves of said other cylinders are maintained in a closed state with said control valves being operated so as to be opened or closed so that combustion gas from said predetermined cylinders is supplied into said other cylinders for complete combustion therein, the discharge of unburnt gas to the outside being thereby prevented.

7. Re-combustion control means for an alcohol engine as set forth in claim 5, wherein said load sensor is designed to detect the engine load by detecting the fuel supply amount of alcohol fuel that is supplied to the engine.

8. Re-combustion control means for an alcohol engine as set forth in claim 5, wherein said valve driving means operate said intake, exhaust and control valves so as to be opened or closed by virtue of electromagnetic force generated when said valve driving means are energized, while said valve driving means maintain said intake, exhaust and control valves in a closed state when said valve driving means are not energized.

* * * * *